(12) United States Patent
Sakakura et al.

(10) Patent No.: US 11,198,392 B2
(45) Date of Patent: Dec. 14, 2021

(54) VEHICLE MONITORING DEVICE

(71) Applicant: ALPHA CORPORATION, Kanagawa (JP)

(72) Inventors: Hiroaki Sakakura, Yokohama (JP); Kazuhiko Kaniwa, Yokohama (JP); Soh Saito, Yokohama (JP); Teruhisa Kato, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 0 days.

(21) Appl. No.: 16/540,894

(22) Filed: Aug. 14, 2019

(65) Prior Publication Data

US 2019/0366927 A1 Dec. 5, 2019

Related U.S. Application Data

(63) Continuation of application No. PCT/JP2018/006073, filed on Feb. 20, 2018.

(30) Foreign Application Priority Data

Feb. 20, 2017 (JP) .............................. JP2017-028576

(51) Int. Cl.
*H04N 7/18* (2006.01)
*B60R 1/00* (2006.01)
*B60R 11/04* (2006.01)
*B60R 11/00* (2006.01)

(52) U.S. Cl.
CPC ................ *B60R 1/00* (2013.01); *B60R 11/04* (2013.01); *B60R 2011/004* (2013.01); *B60R 2300/105* (2013.01); *B60R 2300/802* (2013.01)

(58) Field of Classification Search
CPC ........................................................ B60R 1/00
USPC ........................................................ 348/148
See application file for complete search history.

(56) References Cited

U.S. PATENT DOCUMENTS

| 6,912,001 B2 * | 6/2005 | Okamoto ............... H04N 7/181 348/222.1 |
| 2006/0187304 A1 | 8/2006 | Sakata |
| 2006/0287826 A1 * | 12/2006 | Shimizu ............... B60Q 1/0023 701/431 |

(Continued)

FOREIGN PATENT DOCUMENTS

| EP | 3 505 376 A1 | 7/2019 |
| GB | 2418513 A | 3/2006 |

(Continued)

OTHER PUBLICATIONS

International Search Report issued in PCT/JP2018/006073; dated Apr. 10, 2018.

(Continued)

*Primary Examiner* — Leron Beck
(74) *Attorney, Agent, or Firm* — Studebaker & Brackett PC (57) ABSTRACT

A vehicle monitoring device mounted on a vehicle includes an imaging unit for capturing images of a vehicle body side surface, a rear side and a diagonally backward of the vehicle, a storage unit that stores a reference image defining a reference state of the vehicle body side surface, and an image comparison unit that detects an abnormal state of the vehicle body by comparing the captured images captured by the imaging unit with the reference image read from the storage unit.

4 Claims, 5 Drawing Sheets

(56) References Cited

U.S. PATENT DOCUMENTS

| | | |
|---|---|---|
| 2012/0217764 A1 | 8/2012 | Ishiguro et al. |
| 2016/0185292 A1 | 6/2016 | Asai |
| 2016/0347251 A1 | 12/2016 | Shigemura |

FOREIGN PATENT DOCUMENTS

| | | |
|---|---|---|
| JP | 2006-224873 A | 8/2006 |
| JP | 2011-105058 A | 6/2011 |
| JP | 2015-149614 A | 8/2015 |
| JP | 2016-124391 A | 7/2016 |
| WO | 02/44505 A1 | 6/2002 |

OTHER PUBLICATIONS

Written Opinion issued in PCT/JP2018/006073; dated Apr. 10, 2018.
The extended European search report issued by the European Patent Office dated Jul. 17, 2020, which corresponds to European Patent Application No. 18754124.8-1132 and is related to U.S. Appl. No. 16/540,894.

* cited by examiner

FIG.1

FIG.4

VEHICLE MONITORING DEVICE

CROSS-REFERENCE TO RELATED APPLICATIONS

This is a continuation of International Application No. PCT/JP2018/006073 filed on Feb. 20, 2018, and claims priority from Japanese Patent Application No. 2017-028576 filed on Feb. 20, 2017, the entire content of which is incorporated herein by reference.

TECHNICAL FIELD

The invention relates to a vehicle monitoring device.

BACKGROUND

Conventionally, a vehicle such as an automobile is provided with an outer mirror such as a door mirror. The outer mirror is used when a driver views a rear side and a diagonally backward of the vehicle, and is provided to protrude outward on the side surface of the vehicle body. However, such an outer mirror causes an increase in air resistance when a vehicle travels, and since the shape and size of the mirror are limited, an area to be a blind spot is sometimes generated for the driver.

Patent Document 1 discloses an electric mirror device in which an imaging unit such as a camera instead of an outer mirror is mounted on a vehicle. In the electric mirror device, the rear side and the diagonally backward of the vehicle are captured by the imaging unit, and the captured image is displayed on a monitor in a cabin. In order to appropriately obtain the rear view of the vehicle, the angle of view (imaging range) of the imaging unit is set to include the vehicle body side surface.

Patent Document 2 discloses a camera mounted on an outside handle of a side door of a vehicle for the purpose of detecting an obstacle when the vehicle travels. The imaging range of the camera includes a vehicle body side surface of the vehicle and a rear side of the vehicle.

Patent Document 1: JP-A-2016-124391
Patent Document 2: JP-A-2011-105058

As described above, in recent years, since an imaging unit is mounted on vehicles for various purposes, it has been required to effectively utilize the function of the imaging unit.

SUMMARY

According to an embodiment of the invention, abnormality occurring in a vehicle can be monitored by using an imaging unit mounted on a vehicle body.

In accordance with an embodiment of the invention, in a vehicle monitoring device mounted on a vehicle including an imaging unit that captures images of a vehicle body side surface, a rear side and a diagonally backward of the vehicle, the vehicle monitoring device includes a storage unit that stores a reference image defining a reference state of the vehicle body side surface appearing in the captured image of the imaging unit, and an image comparison unit that detects an abnormal state of the vehicle body by comparing the captured images captured by the imaging unit with the reference image read from the storage unit.

In accordance with an embodiment of the invention, the vehicle preferably includes an electric mirror device that presents to an occupant, the captured image of the rear side and the diagonally backward of the vehicle. In this case, the imaging unit is preferably an imaging unit for capturing an image of the rear side and the diagonally backward of the vehicle, in the electric mirror device.

In accordance with an embodiment of the invention, the imaging unit is preferably attached to an outside handle disposed outside a side door of the vehicle.

In accordance with an embodiment of the invention, the image comparison unit preferably detects the abnormal state of the vehicle when the vehicle stops.

According to an embodiment of the invention, the abnormality occurring in the vehicle would be appropriately monitored by using the captured image corresponding to the rear view of the vehicle.

DESCRIPTION OF EMBODIMENTS

Figure 1:
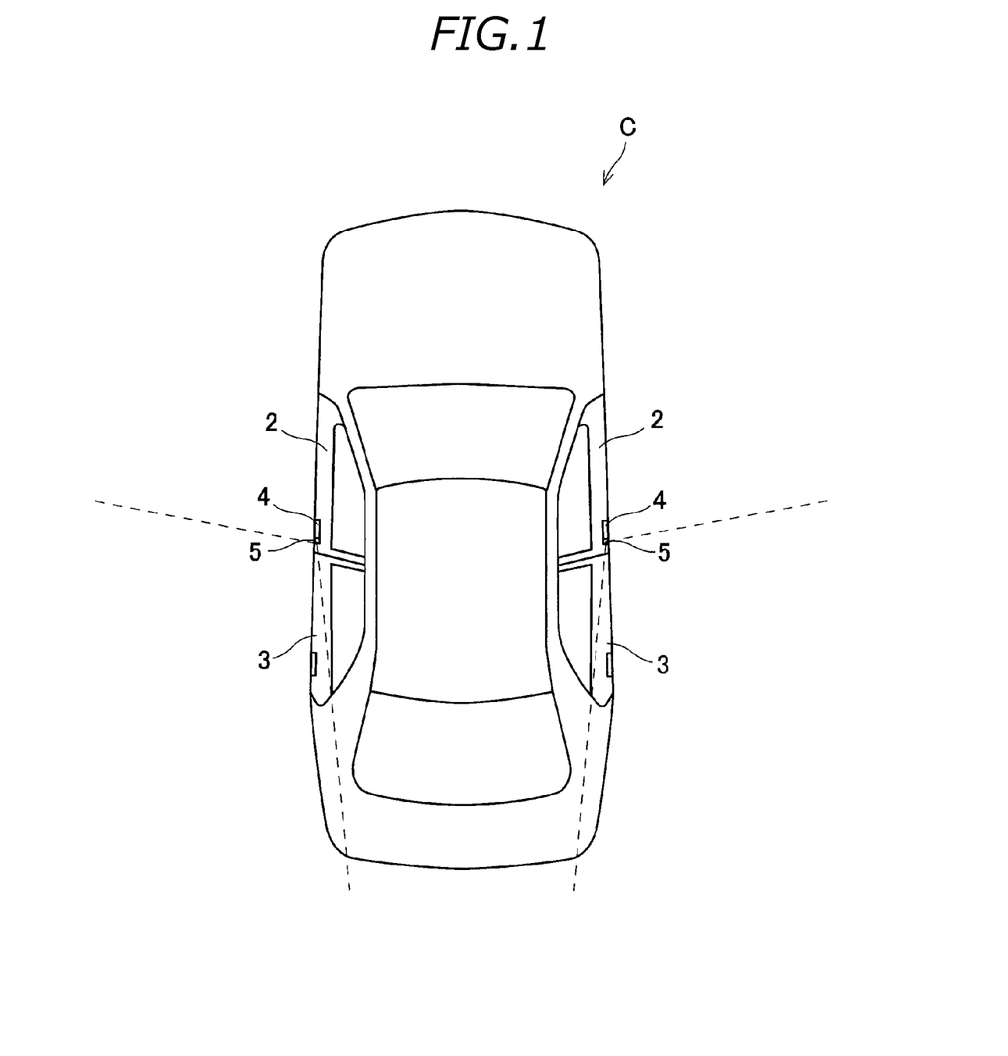
FIG. 1 is an explanatory view showing a vehicle.
Figure 2:
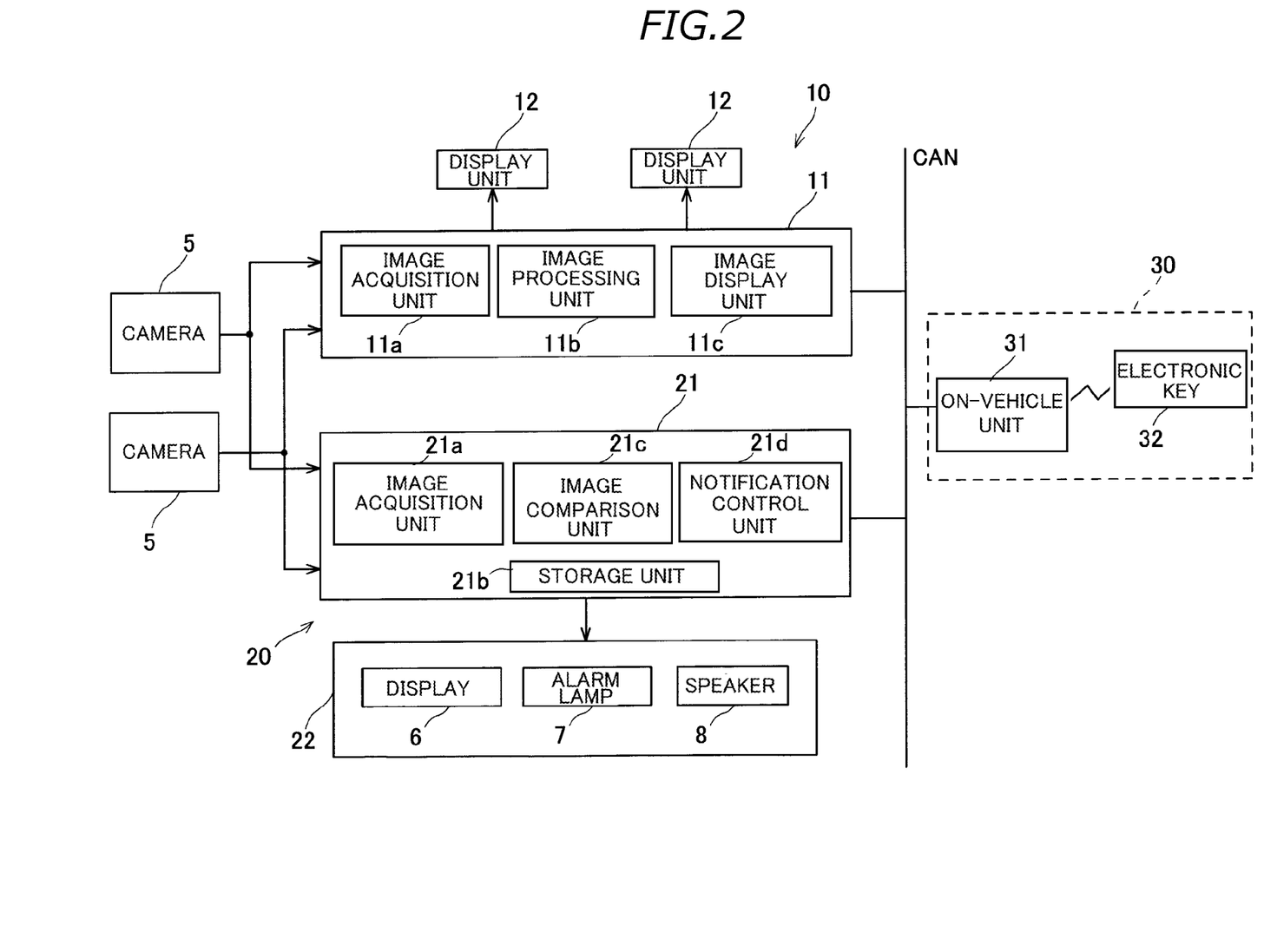
FIG. 2 is a block diagram showing a system configuration of a vehicle including a vehicle monitoring device according to a first embodiment.

Hereinafter, a vehicle C equipped with a vehicle monitoring apparatus 20 according to an embodiment will be described. FIG. 1 is an explanatory view showing the vehicle C. FIG. 2 is a block diagram showing a system configuration of the vehicle C including the vehicle monitoring device 20 according to the embodiment. The vehicle C according to the embodiment is, for example, an automobile of a type having a pair of left and right front side doors 2, and a pair of left and right rear side doors 3.

The vehicle C is equipped with an electric mirror device 10. The electric mirror device 10 is a device that performs rearview recognition by using a camera 5, instead of the outer mirror such as a door mirror. The electric mirror device 10 is mainly configured with a pair of left and right cameras 5 mounted on the vehicle C, an electronic mirror control unit 11, and a pair of display units 12 corresponding to the left and right cameras 5.

The cameras 5 are respectively provided on left and right side surfaces of the vehicle body, and in the embodiment, the cameras 5 are mounted on outside handles 4 of the front side doors 2. Individual cameras 5 capture images of the rear view of the vehicle C, that is, a rear side and a diagonally backward of the vehicle C, including the vehicle body side surface, as shown by the range of broken lines of FIG. 1 (imaging unit). Specifically, the right camera 5 captures images of the rear side and a right diagonally backward of the vehicle C, including the right vehicle body side surface, and the left camera 5 captures images of the rear and a left diagonally backward of the vehicle C, including the left vehicle body side. As the camera 5, a digital camera using an imaging element such as a CMOS and a CCD and a wide-angle lens is preferable.

The electronic mirror control unit 11 is used to control the electric mirror device 10, and as a functional configuration, it includes an image acquisition unit 11a, an image processing unit 11b, and an image display unit 11c. As the electronic mirror control unit 11, a microcomputer which is mainly configured with a CPU, a ROM, a RAM, and an I/O interface would be used.

The image acquisition unit 11a is connected to the left and right cameras 5, and acquires from the left and right cameras 5, captured images obtained by imaging the rear side and the diagonally backward of the vehicle C at a predetermined period. The image processing unit 11b cuts the captured image acquired by the image acquisition unit 11a according to a predetermined cutout range to generate a display image. The image processing unit 11b generates left and right display images corresponding to the left and right cameras 5. The image display unit 11c receives the display image from the image processing unit 11b, and displays the image on the pair of display units 12. At this time, the image processing unit 11b displays the display image processed from the right camera 5 on the display unit 12 corresponding to the right camera 5, and displays the display image processed from the left camera 5 on the display unit 12 corresponding to the left camera 5.

A pair of display units 12 is, for example, an organic EL display, a liquid crystal display, or the like. Each display unit 12 is connected to the electronic mirror control unit 11. A pair of display units 12 is disposed, for example, on the base end portion of each front pillar located on both sides of the windshield, in the cabin. The display unit 12 corresponding to the right camera 5 is disposed at the base end portion of the front pillar on the right side, and the display unit 12 corresponding to the left camera 5 is disposed at the base end portion of the front pillar on the left side. However, the pair of display units 12 may be provided at other parts in the cabin such as an instrument panel.

As one feature of the embodiment, the vehicle C is equipped with the vehicle monitoring device 20. The vehicle monitoring device 20 is a device which monitors an abnormality occurring in the vehicle body side surface of the vehicle C. Abnormality monitored by the vehicle monitoring device 20 corresponds to, for example, a not-fully closed state of a door, a state of foreign matters being caught in the side doors 2 and 3, and an open state of the lid of the oil supply port. The vehicle monitoring device 20 is mainly configured with a monitoring control unit 21 and a notification unit 22. The vehicle monitoring device 20 is not constituted so as to be provided with a pair of left and right cameras independently, and is designed to utilize the left and right cameras 5 provided in the electric mirror device 10.

The monitoring control unit 21 controls the electric mirror device 10, and as a functional configuration, it includes an image acquisition unit 21a, a storage unit 21b, an image comparison unit 21c, and a notification control unit 21d. As the electronic mirror control unit 11, a microcomputer which is mainly configured with a CPU, a ROM, a RAM, and an I/O interface can be used.

The image acquisition unit 21a is connected to the left and right cameras 5, and acquires from the left and right cameras 5, captured images obtained by capturing the rear and diagonally backward of the vehicle C. The storage unit 21b stores a reference image defining a reference state of a vehicle body side surface appearing in the captured image of the camera 5. The storage unit 21b stores a reference image corresponding to the right camera 5 and a reference image corresponding to the left camera 5, respectively. The image comparison unit 21c detects an abnormal state of the vehicle body by comparing the captured image actually captured by the camera 5 with the reference image read from the storage unit 21b. The abnormal state is determined with respect to the left and right vehicle body side surfaces. Specifically, the image comparison unit 21c determines the abnormal state of the right side of the vehicle body by comparing the reference image corresponding to the right camera 5 with the captured image captured by the right camera 5. Further, the image comparison unit 21c determines the abnormal state of the left side of the vehicle body by comparing the reference image corresponding to the left camera 5 with the captured image captured by the left camera 5. Abnormality determined by the image comparison unit 21c is a not-fully closed state of a door, a state of foreign matters being caught in the side doors 2 and 3, and an open state of the lid of the oil supply port, and these abnormalities appear as a feature different from the reference image in the captured image actually captured by the camera 5. In a case where the image comparison unit 21c makes a determination as an abnormal state, the notification control unit 21d controls the notification unit 22 so as to perform notification.

The notification unit 22 is configured to notify the occupant of the predetermined information. As the notification unit 22, a display 6 for navigation provided in an instrument panel, an alarm lamp 7 in a meter device with a speed meter or the like disposed therein, or a speaker 8 can be used.

The vehicle C is provided with a controller area network (CAN), and the electronic mirror control unit 11 of the electric mirror device 10 and the monitoring control unit 21 of the vehicle monitoring device 20 are connected to the CAN to communicate with each other. Further, the monitoring control unit 21 can communicate with the control unit of various sensors and various control systems mounted on the vehicle C through the CAN.

Such a control system includes a vehicle authentication system 30 for locking or unlocking the side doors 2 and 3 of the vehicle C and actuating an engine, called smart entry or passive entry. The vehicle authentication system 30 includes an on-vehicle unit 31 mounted on the vehicle C, and an electronic key 32 possessed by the user of the vehicle C. Since the on-vehicle unit 31 and the electronic key 32 perform authentication by radio communication, without performing a switch operation of the electronic key 32 or an operation by a mechanical key, the vehicle authentication system 30 executes locking or unlocking of the side doors 2 and 3 only in a series of operation process procedures of door opening and closing or activates an engine only by operating an engine switch installed in a vehicle. Further, the vehicle authentication system 30 can also lock or unlock the side doors 2 and 3 through the operation of a switch disposed in the electronic key 32.

Figure 3:
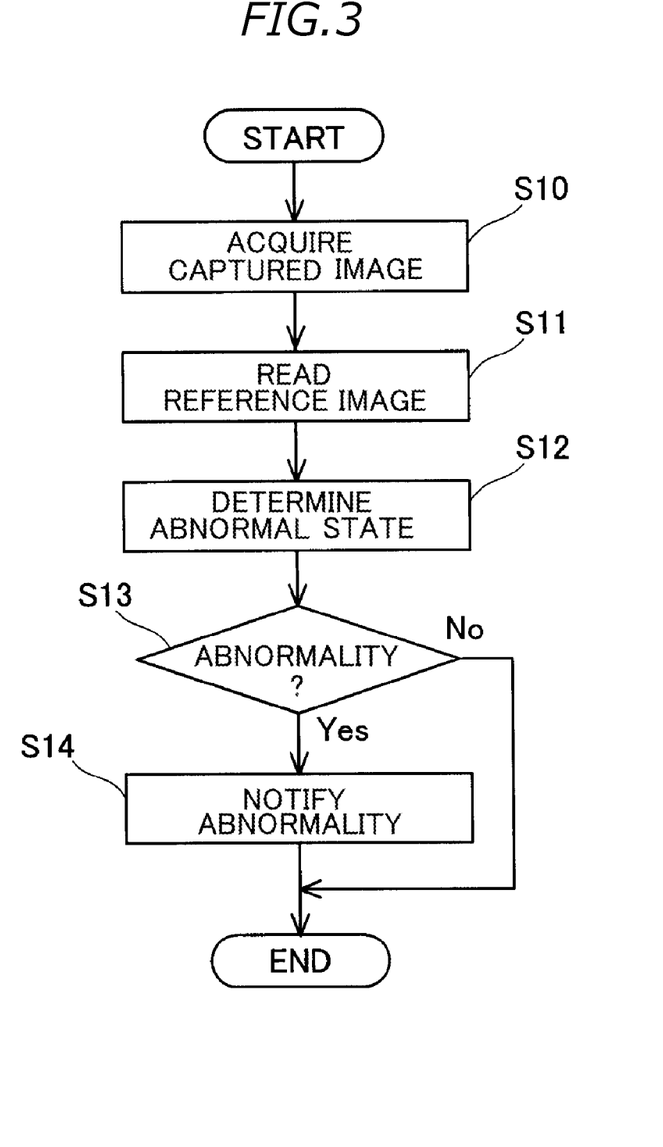
FIG. 3 is a flowchart showing a procedure of monitoring control by the vehicle monitoring device according to the first embodiment.

FIG. 3 is a flowchart showing a procedure of monitoring control by the vehicle monitoring device 20 according to the embodiment. The processing shown in this flowchart is executed by the monitoring control unit 21 with the turning-on of the ignition switch of the vehicle C as a trigger. When the ignition switch is turned on, the vehicle C is in a stop state.

First, in step 10 (S10), the image acquisition unit 21a acquires captured images from the left and right cameras 5, respectively. A vehicle body side surface of the vehicle C and the scenery of rear and rear side of the vehicle C is reflected on the captured images (left and right captured images) output from the left and right cameras 5. The left and right captured images acquired by the image acquisition unit 21a are output to the image comparison unit 21c.

In step 11 (S11), the image comparison unit 21c reads the reference image corresponding to the right camera 5 and the reference image corresponding to the left camera 5 from the storage unit 21b.

In step 12 (S12), the image comparison unit 21c determines the abnormal state of the right side of the vehicle body by comparing the reference image corresponding to the right camera 5 with the captured image acquired from the right camera 5. That is, the image comparison unit 21c compares the right vehicle body side surface (reference image) reflected in the state without abnormality with the right vehicle body side surface (actual captured image) actually imaged, and determines the abnormal state of the right side of the vehicle body from the difference. Abnormality determined by the image comparison unit 21c is a not-fully closed state of the front side door 2 or the rear side door 3, a state of foreign matters being caught in the side doors 2 and 3, and an open state of the lid of the oil supply port.

(1) Not-Fully Closed State of Door

In a case where the front side door 2 is not fully closed, the position of the front side door 2 is shifted outward as compared with a fully closed state, so the position of the camera 5 mounted on the outside handle 4 is also shifted outward. Thus, in a not-fully closed state of a door, the position of the vehicle body side surface (for example, the outer edge position of the vehicle body side surface) reflected in the captured image is deviated as compared with that of the reference image. Thus, it is possible to determine whether the front side door 2 is not fully closed by determining the deviation between the outer edge position of the vehicle body side surface in the captured image and the outer edge position of the vehicle body side surface in the reference image, from the comparison between the captured image and the reference image.

On the other hand, in a case where the rear side door 3 is not fully closed, the position of the rear side door 3 is shifted outward as compared with a fully closed state. Thus, in a not-fully closed state of a door, the position of the rear side door 3 (for example, the outer edge position of the rear side door 3) reflected in the captured image is deviated as compared with that in the reference image. Thus, it is possible to determine whether the rear side door 3 is not fully closed by determining the deviation between the outer edge position of the rear side door 3 in the captured image and the outer edge position of the rear side door 3 in the reference image, from the comparison between the captured image and the reference image.

(2) Foreign Matters Being Caught in the Side Doors 2 and 3.

In a case where the side doors 2 and 3 are closed in a state of foreign matters being caught therein, the foreign matters protruded from the side doors 2 and 3 are reflected on the captured image. Therefore, in a case where features not found in the reference image are present around the outer edges of the side doors 2 and 3 in the captured image (for example, presence of an object of a color different from the color of the vehicle body color or presence of luminance edges not found in the reference image), it is possible to determine that foreign matters are caught from the comparison between the captured image and the reference image.

(3) Open State of Lid of Oil Supply Port

In a case where the lid of the oil supply port is in an open state, the rear end side of the lid is shifted outward as compared with a fully closed state. Thus, in a closed state, the position of the lid (for example, the outer edge position of the lid) reflected in the captured image is deviated as compared with that of the reference image. Thus, an open state of the lid of the oil supply port can be determined by determining the deviation between the outer edge position of the lid in the captured image and the outer edge position of the lid in the reference image, from the comparison between the captured image and the reference image.

In addition to these abnormalities, the image comparison unit 21c compares the reference image corresponding to the right camera 5 with the captured image obtained from the right camera 5, and in a case where a feature different from the reference image can be recognized, within the range of the vehicle body reflected in the captured image, it determines the abnormal state of the vehicle body.

Similar to the right camera 5, the image comparison unit 21c determines the abnormal state of the left side of the vehicle body by comparing the reference image corresponding to the left camera 5 with the captured image acquired from the left camera 5.

In step 13 (S13), the image comparison unit 21c determines whether or not there is abnormality in the vehicle body. In a case where there is an abnormality in the vehicle body, an affirmative determination is made in step 13, and the process proceeds to step 14 (S14). In a case where there is no abnormality in the vehicle body, a negative determination is made in step 13, and this routine is ended by skipping step 14.

In step 14, the notification control unit 21d controls the notification unit 22 so as to make a notification of an abnormal state of a vehicle body. Methods for notification include display of an abnormal state using the display 6 or the alarm lamp 7, audio output or alarm sound output using the speaker 8, and the like. As the contents of the notification, only the presence of abnormality may be notified, but the notification may be made in such a manner that the type of abnormality can be understood.

In the embodiment, the vehicle monitoring device 20 performs monitoring control by comparing the captured image captured by the camera 5 with the reference image to determine the abnormal state of the vehicle body of the vehicle C. Since the camera 5 for obtaining the rear view needs to project the rear side of the vehicle C, the vehicle body side surface of the vehicle C is included in the angle of view. Therefore, the abnormal state appearing in the vehicle body can be appropriately monitored by using the captured image of the camera 5.

Normally, in order to detect a not-fully closed state of a door or forgetting to close the lid of the oil supply port, it is necessary to arrange sensors at a plurality of places and detect such a state. However, according to the method of the embodiment, detection can be realized only by the pair of cameras 5, an increase in the number of components and an increase in cost can be suppressed.

In the embodiment, the camera 5 of the vehicle monitoring device 20 is shared with the camera 5 (imaging unit) that captures an image of the rear and diagonally backward of the vehicle C in the electric mirror device 10.

According to this configuration, it is not necessary for each device to independently prepare an imaging unit, and the imaging unit is shared, so the vehicle monitoring device 20 can be constructed at a low cost. In particular, similarly to the rear view reflected on the outer mirror, the angle of view of the camera 5 in the electric mirror device 10 is likely to be set in order to reduce the difference from the sense of use of the outer mirror in the related art. Therefore, the imaging range of the camera 5 is set so as to include the vehicle body side surface of the vehicle C. Thus, even if the camera 5 is shared, the vehicle monitoring device 20 can appropriately detect the abnormal state of the vehicle body.

Further, the electric mirror device 10 uses the captured image output from the camera 5 when the vehicle C travels, but the abnormality of the vehicle body to be determined by the vehicle monitoring device 20 occurs when an occupant gets on and off a vehicle, so the vehicle monitoring device 20 uses the captured image output from the camera 5 when the vehicle C stops. Therefore, the camera 5 can be used with different functions at the time of travel and at the time of stop, and the camera 5 and its captured image can be effectively utilized.

Further, according to the embodiment, the cameras 5 are attached to the outside handles 4 provided outside the side doors 2 and 3 of the vehicle C.

According to this configuration, even in a vehicle body in which the outer mirror is not in the vehicle body side of the vehicle C, the camera 5 can be disposed at a place where the rear view can be obtained. Thus, the rear view can be effectively obtained and the abnormality of the vehicle body can be appropriately monitored.

In the embodiment, monitoring control is performed when an ignition switch is turned on, on the assumption that an abnormal state when an occupant gets on a vehicle C is detected. However, the monitoring control may be performed when the occupant gets off the vehicle C. For example, after the ignition switch is turned off, power is supplied to the vehicle monitoring device 20 by a predetermined delay time, and the vehicle monitoring device 20 is made operable even after the ignition switch is turned off. The vehicle monitoring device 20 may perform monitoring control when the side doors 2 and 3 are locked using a smart entry function of the vehicle authentication system 30, or the side doors 2 and 3 are locked using the electronic key 32 as a trigger.

When the side doors 2 and 3 are opened or closed while the vehicle C stops with the ignition switch turned on, monitoring control may be performed, when the side doors 2 and 3 are operated from the open state to the closed state as a trigger.

Thus, the monitoring control unit 21 can perform monitoring control in a period not overlapped with the operation period of the electric mirror device 10, for example, when the vehicle stops. Thus, the camera 5 can be used with different functions at the time of travel and at the time of stop, and the camera 5 and its captured image can be effectively utilized.

In the embodiment, the notification control unit 21d controls the notification unit 22 so as to make a notification of the abnormal state of the vehicle body.

According to this constitution, the occupant can be notified of the abnormal state of the vehicle body. Thus, it is possible to suppress the situation in which the vehicle C starts traveling in a state where abnormality occurs in the vehicle body, or is separated from the vehicle C.

In addition, in the embodiment, the notification control unit 21d basically performs control so as to notify an occupant of the abnormal state, but in a case where the image comparison unit 21c determines the abnormal state of the vehicle body, the notification control unit 21d may perform a control other than notification as long as it performs a predetermined control. For example, the notification control unit 21d may perform control to transmit a signal indicating an abnormal state to another control system (external equipment) mounted on the vehicle C. Thus, the control system receiving this signal can perform operations such as making a notification by using the notification unit provided in the system and deactivating the equipment that constitutes the system.

Second Embodiment

Figure 4:
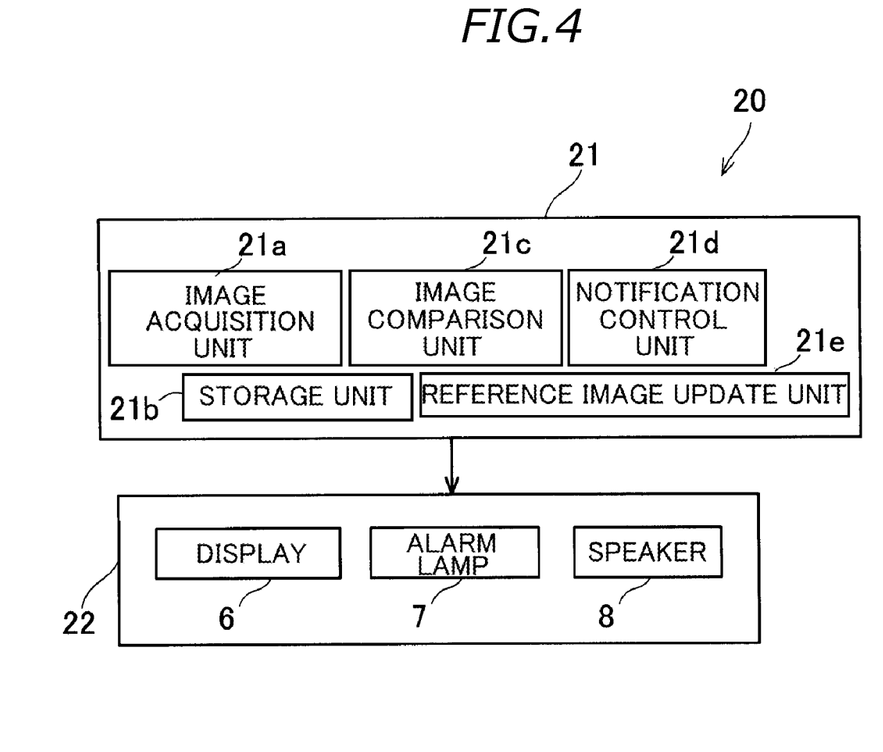
FIG. 4 is a block diagram showing a configuration of a vehicle monitoring device according to a second embodiment.

FIG. 4 is a block diagram showing a configuration of the vehicle monitoring device 20 according to a second embodiment. The vehicle monitoring device 20 according to the second embodiment is different from the vehicle monitoring device 20 of the first embodiment in that it includes a function of updating a reference image. The description of the configuration overlapped with the first embodiment is omitted, and the difference will be mainly described.

A deviation may occur in the positional relationship between the angle of view of the camera 5 and the vehicle body due to aging or the like. In this case, since a deviation may occur in the position of the vehicle body reflected in the captured image, even though the vehicle body is not actually abnormal, the difference from the reference image is recognized and the abnormality is determined. Thus, in the embodiment, as shown in FIG. 4, the monitoring control unit 21 of the vehicle monitoring device 20 includes a reference image update unit 21e, and the reference image stored in the storage unit 21b is updated as necessary by the reference image update unit 21e.

Figure 5:
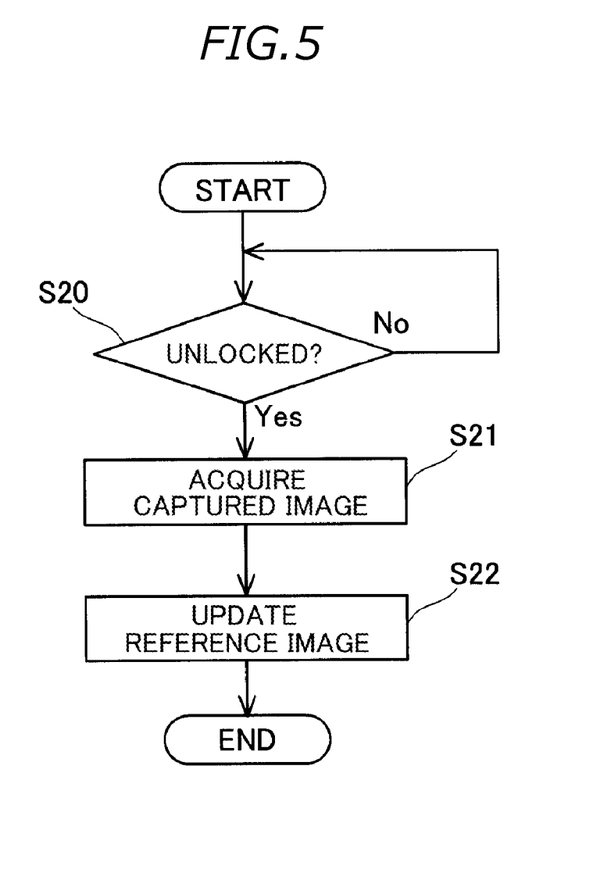
FIG. 5 is a flowchart showing a process of updating a reference image according to the second embodiment.

FIG. 5 is a flowchart illustrating update processing of a reference image. The processing shown in the flowchart is executed by the monitoring control unit 21.

First, in step 20 (S20), the image acquisition unit 21a determines whether or not the side doors 2 and 3 are unlocked. In a case where the side doors 2 and 3 are unlocked, an affirmative determination is made in step 20, and the process proceeds to step 21 (S21). On the other hand, in a case where the side doors 2 and 3 are kept locked, the process returns to step 20.

In step 21, the image acquisition unit 21a acquires captured images from the left and right cameras 5, respectively. The scenery of rear and diagonally backward of the vehicle C, including the vehicle body side surface of the vehicle C, is reflected on the captured images (left and right captured images) output from the left and right cameras 5. The left and right captured images acquired by the image acquisition unit 21a are output to the reference image update unit 21e.

In step 22 (S22), the reference image update unit 21e updates the reference image stored in the storage unit 21b by using the left and right captured images acquired from the image acquisition unit 21a.

According to the embodiment, it is possible to update the reference image for detecting the abnormality of the vehicle body. Thus, when there is aging or even in the case where optional components are added to the vehicle C, it can be reflected on the reference image. Thus, highly accurate monitoring control can be performed.

Further, according to the embodiment, the reference image is updated at a timing when the side doors 2 and 3 are unlocked. Unlocking the side doors 2 and 3 means that the side doors 2 and 3 are in a locked state, so there is a high probability that a situation such as a not-fully closed state of a door or a state of foreign matters being caught does not occur and the side doors 2 and 3 are properly closed. Therefore, the reference image can be updated in a proper state for the vehicle body, by updating the reference image, with unlocking timing as a trigger. As a result, highly accurate monitoring control can be performed.

The vehicle monitoring device according to the embodiment has been described above, but it goes without saying that the invention can be variously modified within the scope of the invention, without being limited to the above-described embodiment.

For example, although the camera is installed in the outside hand in the above-described embodiment, the camera may be installed in a place other than the outside handle.

The present application is based on Japanese Patent No. 2017-028576 filed on Feb. 20, 2017, the contents of which are incorporated by reference in the present application.

REFERENCE SIGNS LIST

C vehicle
2, 3 side door
4 outside handle
5 camera
6 display
7 alarm lamp
8 speaker
10 electric mirror device
11 electronic mirror control unit
12 display unit
20 vehicle monitoring device
21 monitoring control unit
21a image acquisition unit
21b storage unit
21c image comparison unit
21d notification control unit
21e reference image update unit
22 notification unit

What is claimed is:

1. A vehicle monitoring device mounted on a vehicle, the vehicle monitoring device comprising:
   an imaging unit configured to capture images of a vehicle body side surface, a rear side and a diagonally backward of the vehicle;
   a storage unit configured to store a reference image defining a reference state of the vehicle body side surface;
   an image comparison unit configured to detect an abnormal state of the vehicle body by comparing the captured images captured by the imaging unit with the reference image read from the storage unit; and
   a reference image update unit,
   wherein the reference image update unit is configured to update the reference image stored in the storage unit with unlocking timing as a trigger, the unlocking timing being a time when the side doors get unlocked from closed state to open state.

2. The vehicle monitoring device according to claim 1, wherein the vehicle includes an electric mirror device that presents to an occupant, the captured image of rear and diagonally backward of the vehicle captured by the imaging unit.

3. The vehicle monitoring device according to claim 1, wherein the imaging unit is attached to an outside handle disposed outside a side door of the vehicle.

4. The vehicle monitoring device according to claim 1, wherein the image comparison unit detects the abnormal state of the vehicle when the vehicle stops.

\* \* \* \* \*